United States Patent Office 3,848,044
Patented Nov. 12, 1974

3,848,044
CURED PHENOL-FORMALDEHYDE FIBERS AND METHOD FOR THE PRODUCTION THEREOF
Yoshichi Hagiwara, Katunobu Sato, Hideo Komatsu, Sadao Yuguchi, Nobuo Yoshizumi, Kenya Nagai, Hiromu Takeda, and Sei-Ichiro Ohnishi, Otsu, Japan, assignors to Toray Industries, Inc., Tokyo, Japan
Filed Sept. 30, 1971, Ser. No. 185,063
Claims priority, application Japan, Oct. 2, 1970, 45/85,934; Dec. 23, 1970, 45/115,764; Apr. 13, 1971, 46/22,734; May 4, 1971, 46/28,911
Int. Cl. B28b 3/20; C08g 5/06
U.S. Cl. 264—176 F
10 Claims

ABSTRACT OF THE DISCLOSURE

Cured phenol-formaldehyde fibers and a method for the production thereof is provided. In accordance with the teachings of this disclosure, the fibers are produced by melt-spinning a mixture of an curable novolac resin and tetraoxymethylene, trioxane or a mixture thereof. The resulting fibers are thereafter cured using an acid catalyst. The fibers of this invention are especially useful in applications which require excellent heat, flame and chemical resistance.

BACKGROUND OF THE INVENTION

1. Field of the Invention

This invention is concerned with phenol-formaldehyde fibers and the method for the production thereof.

2. Description of the Prior Art

Cured phenol-formaldehyde fibers have heretofore been produced by various methods. In Textile Research J. Vol. 28, 473–7 (1958) and in U.S. Patent No. 3,651,199 a method is disclosed in which the resol resin is used. The solvent is removed from the resulting resin solution to increase the viscosity of the resol resin which can flow at a lower temperature, but is cured at a higher temperature. The resin solution is then spun into fibers by special methods and the resulting uncured fibers are cured by heating or acid treating. In South African Patent No. 6,901,356 and in U.S. Patent No. 3,650,102 a process is suggested which consists of melt spinning a fusible phenol-formaldehyde resin, and curing the resulting uncured phenol-formaldehyde fiber with formaldehyde in the presence of an acid catalyst to render it infusible.

The infusible, cured phenol-formaldehyde fibers produced by the prior art methods possess many desirable properties. They are remarkably resistant to heat and flame; indeed they are virtually infusible and non-flammable. The fibers are also substantially impervious to various chemical reagents and organic solvents.

While the phenol-formaldehyde fibers have been recognized to have valuable properties making them suitable for use in various applications they have not been produced in substantial quantities because of the inherent problems of the processes heretofor suggested in the prior art to produce these fibers.

It is possible by utilizing special methods to produce phenol-formaldehyde fibers by spinning a self-curable resol type resin as is shown in the Textile Research Journal, and in U.S. Pat. No. 3,651,199. However, with the use of these methods it is almost impossible to obtain continuous filaments or to obtain fibers having a uniform diameter, length, tenacity and elongation.

Melt-spinning is therefore desirable. As is shown in the South African patent, but the uncured fiber must be cured after spinning in the presence of formaldehyde and an acid catalyst, the time required for curing the uncured fibers depends upon the molecular weight of the phenol-formaldehyde resin and the curing temperature. When a very high molecular weight novolac is used, shorter, higher temperature curing can be employed. However, it is usually necessary to resort to a somewhat higher spinning temperature than would otherwise be necessary, in order to achieve a melt viscosity which is sufficiently low to permit spinning of fibers. It is frequently found that at this higher temperature there is a tendency for the novolac to gel, thus intefering with proper spinning. On the other hand, when a very low molecular weight novolac is used, the temperature at which the novolac softens and becomes tacky is usually comparatively low, and it is therefore necessary to cure the novolac fibers at a very low temperature to avoid adhesion and/or deformation of the fibers. At any rate, although the curing time varies depending upon the molecular weight of the resins and the curing temperature, providing a curing time of less than three hours is very difficult and this is industrially very disadvantageous. Further, cured phenol-formaldehyde fibers obtained by conventional processes are deeply colored and the tenacity and other physical properties of the fibers are low as compared to commercially available fibers, for example, polyamide fibers.

It is accordingly an object of this invention to overcome the aforementioned problems and difficulties of the prior art.

A further object of the present invention is to shorten the curing time required to produce phenol-formaldehyde fibers.

Another object of the invention is to provide a white cured phenol-formaldehyde fibers.

Still another object of the present invention is to provide cured phenol-formaldehyde fibers which are improved in their physical properties, such as tenacity and elongation, and to provide a process for the preparation thereof.

Other objects and advantages of the present invention will become apparent from the following description.

BRIEF SUMMARY OF THE INVENTION

The objects of the present invention have been achieved by melt-spinning resinous compositions obtained by blending curable novolac (hereinafter referred to as PF) resins with tetraoxymethylene and/or trioxane to obtain uncured PF fibers, and curing the uncured fibers in the presence of an acid catalyst. When it is desired to form white PF fibers uncured PF fibers or cured PF fibers are further treated with at least one compound selected from the group consisting of acid halides, acid anhydrides, phosphorus or silicone halides.

DESCRIPTION OF THE PREFERRED EMBODIMENTS

Resin compositions as used in the present invention, consist of a curable thermoplastic PF resin and tetraoxymethylene, trioxane, or mixture thereof. For purposes of the present invention, any curable thermoplastic novolac resin having a pH of at least 4 may be employed for the production of the fibers. As the phenol used for the production of these resins, almost all kinds of phenolic compound may be used, such as, for example, phenol, p-cresol, o-cresol, m-cresol, o-chlorophenol, resorcinol, 4,4'-dihydroxydiphenylmethane, and bisphenol. However, phenolic compounds which have less than two hydrogen atoms which will react with formaldehyde cannot be used alone, but a mixture thereof with other phenolic compounds may be used. In the present invention, curable novolac type resins are defined as thermostable and curable by hexamethylenetetramine, and must have a pH value of at least 4. We have found that a pH value of the resin is very important, because the thermostability of the resin mixture with tetraoxymethylene and/or trioxane depends strongly on the pH value of the resin. When a resin, whose pH value is at least 4 is used, the resin mixture remains thermoplastic and can be melt spun.

It is preferable to select a phenol-formaldehyde resin which has a molecular weight such that the melt viscosity at the temperature of spinning is within the range of, for example, 100–10,000 poises. When the melt viscosity exceeds 10,000 poises, spinning becomes difficult. On the other hand, when the melt viscosity is less than 100 poises, various problems occur in winding of the extruded fibers, retaining the shape of the fibers and avoiding the adhesion of the fibers.

Tetraoxymethylene and trioxane are both compatible with PF resins and thermally stable so long as the pH value of the resin is at least 4. Tetraoxymethylene is preferably employed. The blending ratio of tetraoxymethylene and/or trioxane is preferable 1–20% and even more preferable about 3–15% by weight, based on the weight of the PF resin. Either tetraoxymethylene or trioxane may be added to the PF resin, or a mixture of both materials can be employed. When the amount of tetraoxymethylene and/or trioxane is less than 1% based on weight of the PF resin the curing time is not effectively shortened. On the other hand, when the amount of tetraoxymethylene and/or trioxane exceeds 20%, the viscosity of the resin composition is reduced to a point where spinning becomes difficult and adhesion of the fibers takes place.

The resin composition can be formed into uncured fibers by melt spinning method. The melt spinning temperature is maintained so that the melt viscosity of the resin composition is within the range of 300–5,000 poises and more preferably 300–3,000 poises. This temperature will vary according to the molecular weight of the resin and the blending ratio of tetraoxymethylene, trioxane or mixtures thereof.

The curing of the uncured PF fibers consists of an acid catalyst treatment and a heat treatment. These treatments may be carried out either sequentially or simultaneously.

The acid catalyst which is used in the process of the present invention is a so-called cationic catalyst. Typical examples are mineral acids such as sulfonic acid and hydrochloric acid; Louis acids such as $BF_3$-etherate, $ZnCl_2$, $AlCl_3$, $SnCl_4$ and $TiCl_4$; organic sulfonic acids such as p-toluenesulfonic acid and phenolsulfonic acid; organic carboxylic acids such as acetic acid and formic acid; compounds which produce an acid by hydrolysis or other reactions, such as acetyl chloride, p-toluenesulfonyl chloride, monochloromethylether thionylchloride phosphorous trichloride or propanesulfone; or further, acid salts such as pyridine hydrochloride and dimethylacetamide hydrochloride. These catalysts may be used in the form of liquids, solutions or gases.

The curing temperature employed depends upon the type of PF resin, type of acid catalyst, the fiber diameter and the curing time. However, it is generally preferable to cure at a temperature ranging from room temperature to 250° C. and more preferably from about 70° to 200° C. When the curing temperature is less than room temperature (22° C.), a longer period of time is required for curing and with the curing tending to become incomplete. On the other hand, when the curing temperature exceeds 250° C., degradation of the resins occurs. Therefore, it is preferable to avoid curing at too high a temperature. The uncured fibers may be partially cured at relatively low temperature, and then completely cured at a high temperature.

The cured PF fibers are then washed with water to remove the acid catalyst and then dried. It is advantageous to dry the fibers at a high temperature to insure complete curing. After the curing is completed, non-flammability properties are imparted to fibers.

In accordance with the process of the present invention, continuous melt spinning is possible because the resin composition, consisting of the novolac resin having a pH of at least 4 and tetraoxymethylene and/or trioxane is thermally stable in the absence of an acid catalyst (cationic catalyst) and is completely homogeneous and has excellent storage stability at any temperature under 200° C.

Figure 1:
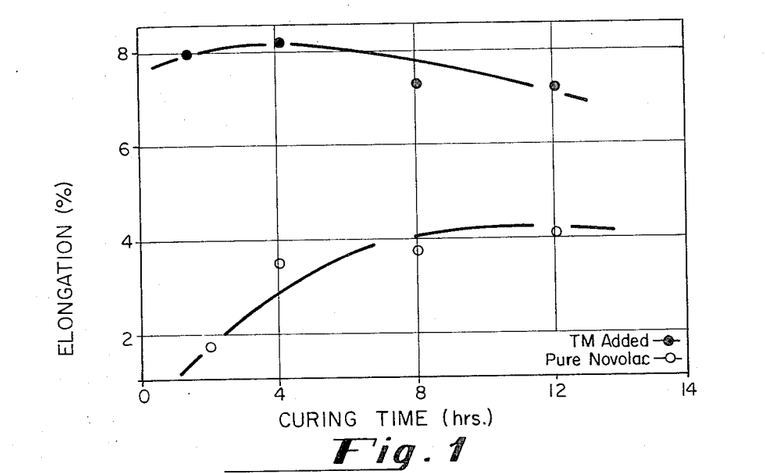
FIGS. 1, 2 and 3 are graphic illustrations showing the effect of curing time on the percent elongation and tensile strength of the PF fiber of this invention and the prior art PF fibers.
Figure 2:
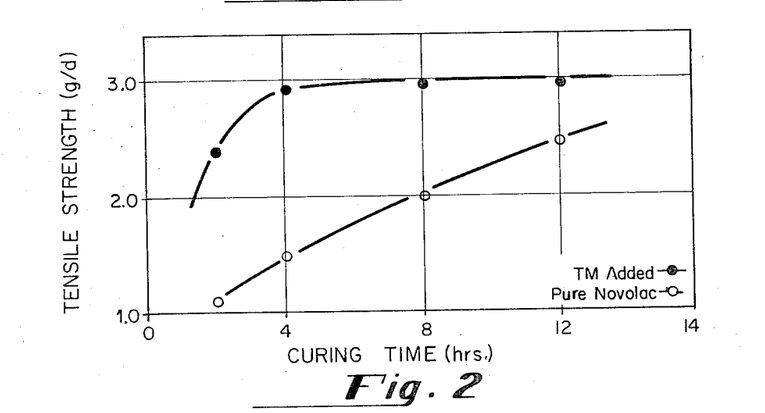
Figure 3:
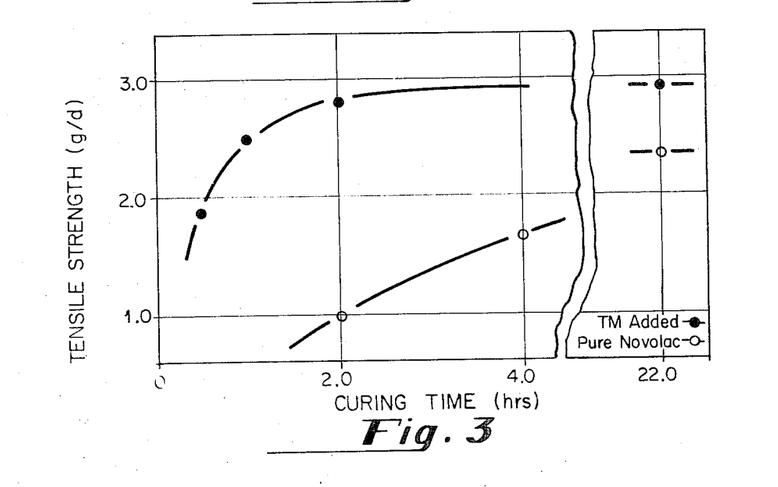

The time required to cure the composition of the present invention in the presence of cationic catalyst is very short. The composition cures uniformly and there is a substantial improvement in the properties. For example, FIGS. 1 and 2 and 3 show the relationship between the curing time and tenacity or elongation of the fibers obtained. From the figures it can be seen that when the curing agent is incorporated in the uncured fibers, the time required for curing can be substantially shortened and relatively thick filaments as well as fine filaments can be readily obtained.

Furthermore, continuous filaments are obtained without adhesion of the filaments which are wound on bobbins because the curing speed is very high. As can be seen from the drawing of the cross sections (magnification 400 times) of the cured PF fibers of this invention (FIG. 4), the fibers obtained in accordance with the present invention have uniform cross section. Accordingly, there are many advantages such as high tenacity and elongation of the fibers obtained with the present invention.

In contrast, in the conventional method of melt spinning wherein a novolac resin, which does not contain an internal curing agent is melt spun and then cured with formaldehyde in the presence of an acid catalyst, the curing time is extensive and the resulting cured fibers have a skin-core structure. These conventional fibers are inferior in their tenacity and elongation. This is considered to be due to the fact that curing speed is directly related to the rate of diffusion of formaldehyde into the fibers. In addition, since the degree of curing is different in the interior of the fibers as compared to the external skin layer, fibers of uniform quality cannot be obtained. However, according to the present invention, almost all of these shortcomings are overcome.

When using the resin composition containing tetraoxymethylene of the present invention, it is possible to shorten the curing time to about ¼ of the time required in the conventional process whein PF resins do not contain tetraoxymethylene or trioxane. This effect can be seen in FIGS. 1 and 2.

Using the aforementioned process for the preparation of cured PF fibers, modified PF fibers can be obtained wherein phenolic hydroxyl groups are blocked and/or cross-linked, by treating uncured or cured PF fibers in the presence of acidic catalyst with compounds which have functional groups that are reactive with the phenolic hydroxyl groups during or after the curing step. As compounds used for the modification of PF fibers, there are, for example:

(1) Acid halides, such as acetyl chloride, benzoyl chloride, p-toluenesulfonyl chloride (TsCl), cyanuric chloride and other polyfunctional acid chlorides, (2) Acid anhydrides, such as acetic anhydride, propionic anhydride, maleic anhydride and phthalic anhydride, (3) Halogenated phosphorus or silicone compounds, such as, $PCl_3$, $POCl_3$, $SiCl_4$, $(CH_3)_2$, $SiCl_2$, $PCl_5$ and $PBr_3$.

An aliphatic lower acid derivative having reactivity with a phenolic hydroxyl group and polyfunctional compounds shown by the following general formulas (I)–(IV) are preferable.

Formula I wherein $R_1$ represents a polyvalent radical selected from aliphatic and aromatic radicals and $n$ is an integer of from 2 to 4.

More specifically, such compounds include oxalyl chloride, succinyl dichloride, terephthalic acid dichloride, fumaric acid dichloride, butanetricarboxylic acid trichloride, butenetricarboxylic acid trichloride, trimellitic acid trichloride, butanetetracarboxylic acid tetrachloride, pyromellitic acid tetrachloride, naphthalene-tetracarboxylic acid tetrachloride, pyridine-3,5-dicarboxylic acid chloride and benzophenonetetracarboxylic acid tetrachloride.

Formula II wherein X is halogen, $m$ is an integer not less than 2, $R_2$ is where $R_3$ is halogen, alkyl, phenol, alkoxy or a phenoxy group.

Such compounds, include phosgene, dichlorodimethyl silane, dichlorodiphenyl silane, trichloromonomethyl silane, cyanuric chloride, monophenoxy cyanuric chloride, trichlorophosphine, pentacholrophosphine, oxytrichlorophosphine.

Example of lower aliphatic acid derivatives, are acetic anhydride, acetyl halide and derivatives of aliphatic carboxylic acids having not more than 3 carbon atoms.

We have found that blocking or cross-linking of phenolic hydroxyl groups by a modification agent is pronounced when conducted in an acid state. Accordingly, both modification and curing should be conducted under acidic conditions because the cross-linking with tetraoxymethylene and/or trioxane, which is incorporated in the resin composition used in the present invention, occurs simultaneously with the modification.

Mixtures of the above agents may also be used.

The modification of the PF fibers by the aforesaid modification treating agents may be carried out in the gaseous or liquid phase in accordance with the nature or property of the modificating agents. It is preferable to treat uncured fiber in an acidic solvent-solution which will not dissolve the fiber and in which the modificating agent is miscible and unreactive. Such solvents, include n-hexane, cyclohexane, petroleum ethers, solvent naphtha, dichloroethane, tetrachloroethane, benzene, toluene, and xylene. The concentration of the modificating agent should preferably be at least 1%. When treating cured fibers, obtained by pre-curing of the uncured fibers in the presence of acid catalysts, various kinds of solvents and acidic catalyst may be used. Sometimes it is preferable to use the modificating agents as the solvent. For example, a polar solvent such as acetic anhydride, dimethyl formamide (DMF), dimethyl sulfoxide (DMSO), dimethyl acetamide (DMAc), acetic acid and formic acid may be used.

The time required for treating the PF fibers with a modification agent depends upon the nature and the concentration of the modification agent, the treating temperature and the degree of cure of the PF fibers. It is desirable so as to increase productivity that the fiber be modified within as short a period as possible and preferably within several hours.

It is preferable to use a polyfunctional compound as the modification agent rather than a monofunctional compound. The polyfunctional compounds will react with the phenolic hydroxyl groups and reduce the time required for curing, with the properties of the obtained modified fibers, such as tenacity and elongation, being excellent.

It is useful to use a composition obtained by blending tetraoxymethylene or trioxane with PF resins to prepare white PF fibers because the curing time is reduced and the resulting fibers from such composition have high cross-linking density and a high tenacity and elongation. In addition, the conversion (reaction ratio) of phenolic hydroxyl groups can be substantially increased by using the above mentioned compositions.

The most remarkable effect of the present invention is the whiteness and the stability of the modified fibers. In the fibers of the present invention, most of the phenolic hydroxyl groups do not exist in a free state. Accordingly, discoloration brought about by the oxidation of the phenolic compounds is very slight. The fibers of the present invention are suitable for clothing and other general uses.

It is preferable that the degree the cross-linking and/or blocking of phenolic hydroxyl groups be at less than 15, preferably less than 10 expressed by whiteness ($b$ value) which is determined by a method to be described below. When the $b$ value is larger than 15, the fiber is unsuitable where coloration is a problem, let alone for industrial uses. When the $b$ value is less than 15, the fibers can be dyed and used for a wide range of uses.

As is apparent from the aforementioned characteristics, the modified PF fibers of the present invention are not discolored, like the conventional phenol-formaldehyde resin shaped articles and are easily dyeable by conventional methods. Accordingly, the fibers obtained by the present invention can be used for uses similar to those of the conventional commercially available fibers. In particular, since the fibers have many characteristics such as excellent flame and heat resistance, they are very useful for interior uses such as curtains and for electrical appliances.

The following examples are given by way of further illustration of the present invention and are not intended to limit the scope of the subject beyond that of the subjoined claims.

All parts and percentages are parts and percentages by weight not volume unless otherwise noted.

The "$b$ value," which is a scale showing the degree of whiteness of fibers, tenacity, elongation, hollow ratio and pH reported in the following examples are values measured as follows:

The $b$ value is obtained by charging about 1 g. of PF fibers into a transparent cylindrical cell (diameter 30 mm.; height 10 mm.). The L, $a$ and $b$ values are determined by a Hunter type color difference meter. The $b$ value is a scale for estimating yellowness. The closer to zero the $b$ values are the whiter is the sample.

The tenacity and elongation of the PF fiber were determined by allowing the PF fiber to condition at 20° and 65% RH for 24 hours. The tenacity and elongation of the fiber were measured by a Tensilon type UTM tenacity/elongation measuring machine. The test length of the sample was 50 mm. and the tensile speed was 50 mm./mins.

To obtain the hollow ratio PF cured yarn was solvent extracted with acetone. The microscopic photograph of the cross section of the fibers was taken and the ratio was calculated from the photograph by the following equation.

$$\text{Hollow ratio} = \frac{\text{Area of the hollow portion}}{\text{Area of the hollow + cross sectional area of the fiber portion}}$$

To obtain the pH of the PF 15 g. of PF resin was dissolved in 50 ml. of methanol. The pH of this solution was measured by a hydrogen electrode pH meter.

EXAMPLE 1

(a) Preparation of PF 940 g. of phenol, 281 g. of 37% formalin and 2 g. of 95% sulfuric acid were charged in a 2-liter three-necked flask. The flask was gradually heated to raise the temperature to 70° C. When the initial exothermic reaction was completed, 410 g. of 37% formalin were gradually added dropwise to the heated mixture through a dropping funnel. After completion of this addition, the resulting mixture was allowed to reflux for 4 hours to complete the reaction. Thereafter, a solution of 1.65 g. of sodium hydroxide in 50 g. of water was gradually added to the reaction mixture to neutralize the sulfuric acid. The mixture was vacuum distilled to remove the water present. The temperature was gradually increased to a final temperature of 150° C. and the resulting resin was dried at 150° C. under a reduced pressure of 2 mm. Hg for 1 hour. The total amount of resin obtained was 1030 g. This resin is hereinafter referred to as resin A.

The inherent viscosity of the resin as measured in dimethylformamide at a concentration of 0.5% and 25° C. was 0.11. The pH of this resin in methanol was 7.5.

(b) Mixing Resin A with tetraoxymethylene and viscosity stability

The novolac resin, Resin A, obtained in step (a) was pulverized. And 10% by weight of tetraoxymethylene was added. The mixture was mixed and melted in a bath at 150° C. to obtain a uniform composition. The melt viscosity of the composition at 150° C. was 34 poises. The melt viscosity of the composition after it was left to stand at 150° C. for 6 hours was 38 poises. Since there was no substantial change in the viscosity, the viscosity stability was considered good.

This composition was converted into fibers using a melt spinning machine equipped with a gear pump and the uncured fibers were easily wound on a bobbin with a traverse guide.

When a pure novolac was used for comparison, the resulting uncured fibers had no substantial flexibility or elasticity. Upon winding the fibers, breakage occurred quite often at the traverse guide. For this reason, the resulting uncured fibers had to be wound around a roller.

The spinnability depends upon mainly the rate of extrusion, melt viscosity and shape of the orifice. When the melt viscosity was 600–2000 poises, the best spinnability was observed and the smallest denier filaments were obtained.

In Table 1, the spinnabilities at the most satisfactory viscosities of a TM (tetraoxymethylene)-containing novolac and a pure novolac are shown for purposes of comparison.

TABLE 1.—SPINNABILITY OF A TM-CONTAINING NOVOLAC COMPARED WITH A PURE NOVOLAC

|  | Orifice | Melt temperature, °C. | Highest taking-up speed, m./min. | Denier of the single filament |
|---|---|---|---|---|
| TM-containing novolac. | 0.5 mm. x 5H | 110 | >1,460 | <0.9 |
| Pure novolac | 0.2 mm. x 8H | 140 | 1,000 | 0.64 |

(c) Curing, after treatment

The filaments of the TM-containing novolac for comparison were immersed in 36% hydrochloric acid. The filaments of the pure novolac were immersed in a 1:1 mixed solution of 36% hydrochloric acid and 37% formalin. The temperature was gradually raised from room temperature to 90° C. in 30 minutes. Thereafter, the temperature was maintained at 90° C. to complete the curing reaction.

After the curing reaction was conducted for a predetermined time, the fibers were removed, washed with water and dried at 120° C. under a reduced pressure for 6 hours.

The taking-up speed in spinning was varied to obtain filaments of different deniers. These filaments were cured by the aforementioned described curing method. The tensile strength and percent elongations at the break of the cured fibers were measured. The results are reported in Table 2. Larger denier cured yarns of more than 3–4 d. obtained from the pure novolac were brittle after the curing reaction and their tensile strength and break elongations could not be measured by a Tensilon tensile strength tester. In contrast, a 3 d. cured fiber obtained from the TM-containing novolac had a tensile strength of 2.1 g./d.

TABLE 2.—DENIER OF A SINGLE YARN AND TENSILE STRENGTH AND BREAK ELONGATION OF A CURED FIBER

| Material resin | Denier of a single yarn | Curing conditions | Tensile strength, g./d. | Break elongation, percent |
|---|---|---|---|---|
| TM-containing novolac. | 7.8 | Highest temperature at 60° C. for 6 hours. | 1.0 | 3.7 |
| Do | 3.0 | Highest temperature at 90° C. for 6 hours. | 2.1 | 8.4 |
| Do | 1.8 | do | 2.8 | 8.2 |
| Pure novolac | 6.7 | Highest temperature at 100° C. for 25 hours. | Could not be measured. | |
| Do | 3.8 | do | Could not be measured. | |
| Do | 1.7 | Highest temperature at 90° C. for 6 hours. | 2.0 | 3.8 |

Example 2

(2–1) By the method of Example 1, the resin A alone and a composition obtained by adding 10% of TM to the resin A were spun to obtain uncured fibers shown in Table 3.

TABLE 3

| TM added | Orifice | Melting temperature, °C. | Maximum taking up speed, m./min. | Denier of a single yarn |
|---|---|---|---|---|
| (Control), 0% | 0.5 mm. x 5H | 140 | 1,000 | 1.7 |
| (Present invention), 10%. | 0.5 mm. x 5H | 110 | 1,000 | 1.8 |

The uncured fiber obtained which did not contain TM was immersed in a 1:1 mixed solution of 36% hydrochloric acid and 37% formalin. The uncured fiber obtained which contained TM was immersed in 36% hydrochloric acid. The temperature was gradually raised from room temperature to 90° C. in 30 minutes. Thereafter, the temperature was kept at 90° C. to complete the curing reaction. After the curing reaction was conducted for a predetermined time, the filaments were removed, washed with water and dried in vacuum at 120° C. for 6 hours.

The relation between the tenacity and percent elongation and of the obtained cured fibers and the curing time is shown in FIG. 1. The filament which did not contain TM was not cured using only an acid catalyst. From FIGS. 1 and 2, it can be seen that the curing time for achieving a tensile strength of 2.0 g./d. which is necessary for a commercially acceptable fiber was less than ¼ of that required for the control showing that the effect of adding TM was significant.

Further, as noted in Example 1, the TM functions as a plasticizer so that the handling of an uncured filament was very easy. When there was no TM in the filaments, it was not possible to traverse the uncured filament upon winding apparatus. The composition of the present invention could however be traversely wound and not damaged.

(2-2) An uncured fiber containing 10% of TM obtained in Example (2-1) was dipped in the catalyst solutions shown in Table 4 and continuously treated with dry heat at 120° C. to measure the curing times. It is apparent that acid catalysts which generated acids are very effective.

TABLE 4

| Catalyst | | Concentration, percent | Solvent | Curing time, seconds |
|---|---|---|---|---|
| TM containing filaments. | H₂SO₄ | 10 | Water | <5 |
| Do | PCl₃ | 10 | Hexane | <5 |
| Do | TSCl | 5 | do | <5 |
| Do | Oxalic acid | 20 | Water | 16 |
| Do | Acetyl chloride | 15 | Hexane | 8 |

(2-3) Using the resin A, two uncured 1.7 d. filaments were prepared one of which contained 10% of TM. These fibers were respectively immersed in a 1:1 mixed solution of 35% hydrochloric acid and 37% formalin and cured at 90° C. The temperature was gradually raised from room temperature to 90° C. in 30 minutes.

The tensile strengths of the obtained cured fibers are shown in FIG. 3. According to FIG. 3, the curing time required for attaining a tenacity of at least 2.0 g./d. with the filament which contained TM was about 1 hour and the cure was obtained in about ⅛ the time as compared with the filament that did not contain TM.

The cured filaments (curing time 2.0 hours) were each extracted with acetone for an extended period of time using a Soxhlet extractor. The sections of the filaments were photographed under a microscope. The results are shown in FIG. 4 for the filaments of the invention and FIG. 5 for the prior art filaments.

Figure 4:
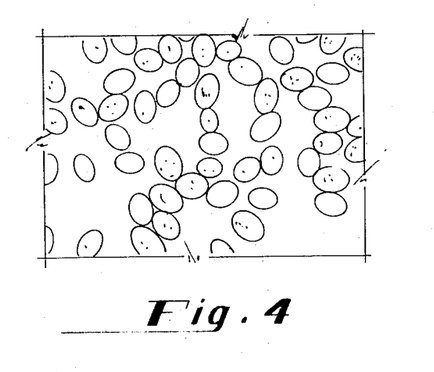
FIG. 4 is a pictorial illustration of the cross section of the PF fibers of this invention magnified 400×.
Figure 5:
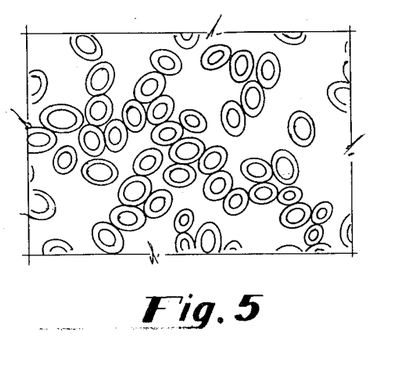
FIG. 5 is a pictorial illustration of the cross section of the PF fiber of the prior art magnified 400×.

As is apparent from FIGS. 4 and 5, the filament which contained TM is completely cured. The filament which did not contain TM had the uncured interior portion extracted and the cured fiber became a hollow fiber. When an uncured fiber containing TM was cured for 30 minutes, the entire fiber including the interior was fully cured. Even when an uncured yarn which does not contain TM is cured for more than 8 hours, after extraction it still becomes a hollow yarn.

(2-4) By the method described in Example 1, from the resin A alone and a composition of the resin A containing 10% of TM, samples of uncured fibers of different denier were prepared. The fibers were cured by the method of Example 2-3.

Figure 6:
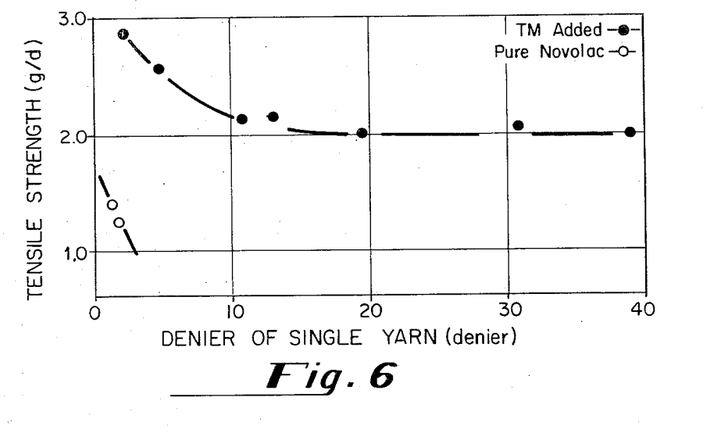
FIGS. 6 and 7 are graphic illustrations of the effects of denier on tensile strength and percent elongation respectively.
Figure 7:
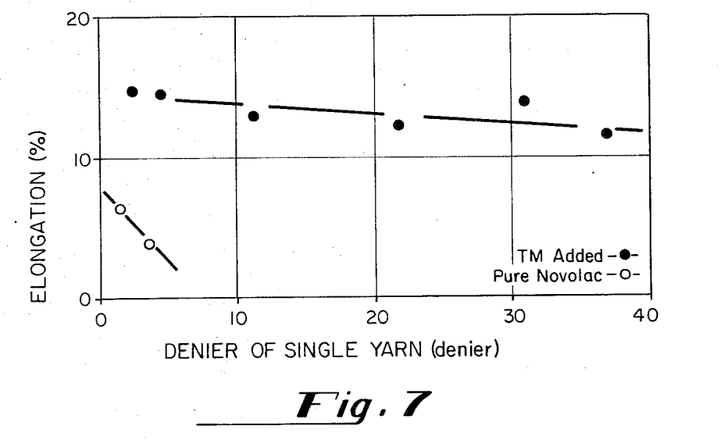

The tensile strengths and percent elongations at the break of the cured fibers is shown in FIG. 6 and FIG. 7, respectively. As is apparent from FIGS. 6 and 7, very desirable results are obtained on curing uncured fiber of the composition of the present invention. It is possible to obtain cured fibers having large denier of at least 10 which have a high percent elongation which are uniformly cured.

(2-5) When trioxane (TO) is used in place of TM, the same effect is obtained: To the resin A, 10% by weight of trioxane was added and the mixture was spun to obtain a 4.2 d. uncured fiber. The uncured fibers were cured in a 36% aqueous solution of HCl at 90° C. or in a 1:1 mixed solution of 36% hydrochloric acid and 37% formalin at 90° C. The obtained cured fibers and their tensile strength were shown in Table 5.

TABLE 5

| Curing time, hour | In 36% HCl, g./d. | In 36% HCl/37% formalin (1:1), g./d. |
|---|---|---|
| 0.5 | 1.0 | 1.1 |
| 1.0 | 1.8 | 2.0 |
| 4.0 | 2.4 | 2.7 |

Example 3

*Preparation of representative novolac resins*

(3-1) Resins different in melt viscosity (degree of polymerization). A two-liter three-necked flask was charged with 940 g. of phenol and 2 g. of 95% sulfuric acid. The flask was immersed in a bath at 110° C. and 648 g. (0.8 mol based on phenol) of formalin (37%) were added dropwise in 105 minutes. After completion of this addition, the reaction was carried out for 3 hours under reflux and thereafter a 50% aqueous solution of NaOH in an amount equivalent to the sulfuric acid used was added to the reaction product to effect neutralization. After completion of this step, the water layer was removed by decantation. Thereafter, dehydration and dephenolization were carried out in a bath at 160° C. under a reduced pressure of below 10 mm. Hg for 3 hours. The obtained resin had a viscosity of 580 poises at 150° C. and a pH of 6.75. This resin was labled B-1.

Similarly, by varying the molar ratio of phenol to formaldehyde, resins having the melt viscosities at 150° C. shown in Table 6 were synthesized.

TABLE 6.—PF RESINS DIFFERENT IN VISCOSITY

| No. | Molar ratio of phenol/formaldehyde | Melt viscosity poises at 150° C. | pH |
|---|---|---|---|
| B-1 | 1/0.80 | 580 | 6.75 |
| B-2 | 1/0.76 | 170 | 6.5 |
| B-3 | 1/0.82 | 1,400 | 6.2 |
| B-4 | 1/0.83 | 2,500 | 6.8 |

(3-2) In a method similar to the method for preparing resin B-1, by varying the amount of NaOH used for neutralization, resins C-1–C-8 were prepared whose pH values measured by the method described in this specification are shown in Table 7.

TABLE 7.—PF RESINS DIFFERENT IN pH

| Resins | NaOH* | pH |
|---|---|---|
| C-1 | 0.50 | 2.00 |
| C-2 | 0.60 | 2.80 |
| C-3 | 0.70 | 3.80 |
| C-4 | 0.80 | 4.90 |
| C-5 | 0.85 | 5 50 |
| C-6 | 0.09 | 5.85 |
| C-7 | 1.00 | 6.75 |
| C-8 | 1.50 | >10.00 |

*Amount of NaOH based on sulfuric acid used.

Example 4

(4-1) Five 5 g. sample of resin B-1 obtained in Example 3-1 were placed in test tubes. To each of these test tubes 0.5 g. of the various kinds of cross-linking agents shown in Table 8 were added and each of these test tubes was heated in a bath at 150° C. to examine the compatibility of the cross-linking agent with the resin and effect on viscosity stability. The results are shown in Table 8. Only when the cross-linking agent was trioxane or tetraoxane was the compatibility with the resin good. Moreover, when the resultant compositions were left to stand at 150° C. for 5 hours, there was no substantial change in the viscosity.

TABLE 8

| Cross-linking agent | Compatibility | Viscosity stability |
|---|---|---|
| Hexamethylene tetramine. | Not dissolved but gelled. | Gelled within 5 minutes. |
| Paraformaldehyde | do | Do. |
| Trioxane | Dissolved uniformly. | Unchanged after lapse of 5 hours. |
| Tetraoxane | do | Do. |
| Polyoxymethylene | Insoluble (phase separation). | Unstable. |

(4–2) To 5 grams of each of the resins C–1–C–8 obtained in Example (3–2), 0.5 part each of tetraoxymethylene was added and the viscosity stability of the resultant compositions was examined in a bath at 150° C.

In the case of C–1, the composition gelled within 10 minutes. However, when larger amounts of NaOH were used for the neutralization, the time required for gelation was increased. In case of C–5, the composition did not gel for 2–3 hours. And in case of C–6, even when the composition was left to stand at 150° C. for 5 hours, it did not substantially gel.

Accordingly, when the residence time necessary for an ordinary melt-spinning machine is taken into account, the pH of the resin should be at least 4.

Example 5

Figure 8:
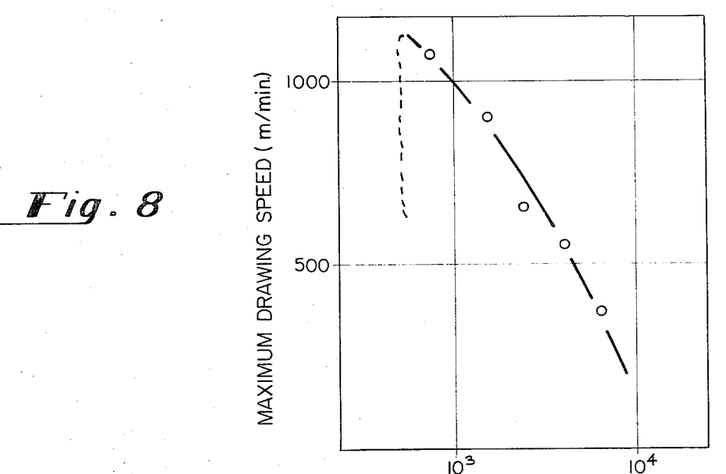
FIG. 8 is a graphic illustration of the relationship between melt viscosity and maximum drawing speed.

(5–1) Compositions obtained by blending 10% of TM with each of the resins B–1–B–4 were spun through an orifice 0.5 mm. x 5H. By varying the resin and spinning temperature, the melt viscosity of the composition was changed. The maximum taking-up speed was plotted on the axis of ordinate and the melt viscosity was plotted on the axis of abscissa and their relationship is shown in FIG. 8.

When the melt viscosity of the composition was less than 300 poises, winding of the fiber was difficult even at the low speed of 100 m./min. When the melt viscosity was 2000 poises or higher, extrusion of the composition was difficult.

However, when the inner diameter of orifice was larger such as, for example, 2.0 mm. φ even when the melt viscosity was at least 100 poises, fiber was obtained. However, this process was impractical since the fibers had considerable denier variation along a single filament. When the melt viscosity was 5000 poises or more, it was also difficult to obtain fiber and spinning of the composition having melt viscosity of at least 10,000 poises was close to impossible.

(5–2) Various amounts of TM were added to resin A. The spinnability of the obtained compositions was evaluated. By controlling the temperature, these compositions were spun at a melt viscosity of 1000 poises, and taking-up speed of 500 m./min. using an orifice with an inner diameter of 0.5 mm. at an extrusion amount of 0.1 g./min. The number of yarn break which occurred in 10 minutes was measured. The filaments were wound on a bobbin. The amount of melting among the single yarns which occurred was also evaluated.

The uncured fibers were cured in a 36% HCl aqueous solution and a 1:1 mixed solution of 36% HCl and 37% formalin aqueous solution at a maximum temperature of 90° C. for 4 hours. The tensile strength of the cured fibers were measured. The results are shown in Table 9.

TABLE 9.—EFFECT OF THE TM CONTENT

| TM percent by weight | Spinability | Degree of adherence and deformation | Tensile strength of cured yarn, g./d. | |
|---|---|---|---|---|
| | | | 36% HCl | 36% HCl–37% HCHO |
| 0 | △ | O | — | 0.0 |
| 3 | O | O | 1.5 | 2.2 |
| 5 | ⊙ | O | 2.0 | 2.8 |
| 10 | ⊙ | O | 2.6 | 2.9 |
| 15 | O | O | 2.6 | 2. |
| 20 | △ | △ | 2.0 | 2.0 |
| 25 | X | X | — | — |

Note.—M=Excellent, O=good, =average, X=failure, --=could not be measured.

As is apparent from Table 9, even when more than 20% of TM was added, due to its plasticity, the melt viscosity lowered excessively and the composition could not be spun. When the amount of TM was small, cross-linking and curing were insufficient. It is accordingly preferable that the amount of TM be 1–20% by weight and more preferable 3–15% by weight.

Example 6

(6–1) Process for preparing resins (a) Change of catalyst (HCl catalyst)

A two liter three neck flask was charged with 340 g. of phenol and 10.5 g. of a 35% HCl aqueous solution. The flask was immersed in a bath at 100° C. To the content of said flask, 690 g. of formalin was added dropwise through a dropping funnel. After termination of the dropping, the mixture was reacted for 3 hours while the flask was immersed in a bath at 100° C. Subsequently, sodium oxide was added to the reaction mixture to neutralize the reaction mixture. The bath temperature was elevated under reduced pressure while distilling off the water. Finally the content of said flask was heated at 150° C. under a reduced pressure of 5 mm. Hg for 30 minutes. The inherent viscosity in dimethyl formamide (0.5% at 25° C.) of the obtained resin was 0.15. The pH of the resin was 5.8. This resin was labeled Resin D.

(b) Change of catalyst (Ca(OH)₂ catalyst)

2.4 g. of calcium hydroxide was added to 980 g. of phenol. 405 parts of 37% formalin was added to the mixed solution. The container holding the resultant mixed solution was immersed in a bath at 120° C. The content was refluxed for 3 hours. Thereafter, 6.75 g. of 35% hydrochloric acid was added to the content. While water was distilled off under atmospheric pressure, the obtained solution was reacted in the container immersed in the bath at 140° C. for 1 hour. The temperature of the bath was elevated to 160–170° C. and the reaction solution heated under atmospheric pressure for 1.3 hours. Thereafter, the reaction mixture was heated for 1 hour while phenol was distilled off under a reduced pressure (20 mm. Hg). The inherent viscosity (in dimethyl-formamide, 2.5% at 25° C.) of the resulting resin was 0.20. The pH of this resin was 8.2. This resin was labeled resin E.

(c) Copolymer 4 parts of 95% sulfuric acid was added to 940 parts of phenol and 1080 parts of p-cresol and the temperature was raised to 70° C. To this mixture, 1230 parts of 37% formalin was gradually added dropwise while the temperature was kept at 110–115° C. After completion of the formalin addition, in accordance with the process of Example (6–1) (a) a copolymer resin was obtained. The inherent viscosity of the obtained resin (in dimethyl-formamide, 0.5% at 30° C.) was 0.17 and the pH of the resin was 5.7. This resin was labeled resin F.

(d) Bisphenol A resin 1056 parts of bisphenol A, 324 parts of 37% formalin and 10 parts of concentrated hydrochloric acid were blended together. 1000 parts of toluene was added and the mixture was refluxed for 3 hours. Thereafter, the upper layer was removed. To the resin layer, 500 parts of acetone was added and the resulting mixture was homogeneous. Thereafter 2000 parts of water was added to the reaction mixture. The resultant mixture was refluxed and washed. The upper layer was removed by decantation. The resin layer was washed with hot water several times. The mixture was placed in a bath at 120° C. and water was distilled off while dry nitrogen gas was gradually introduced. The resin was recovered, finely pulverized and thereafter, dried at 50° C. under a reduced pressure of 10 mm. Hg for 24 hours. The inherent viscosity (in alcohol at 25° C.) of the obtained resin was 0.10, and the pH of the resin was 4.8. This resin was labeled resin G.

(e) Diphenyl oxide modified resin 460 parts of diphenyl oxide, 300 parts of trioxane and 12 parts of paratoluene-sulfonic acid were blended together. The mixture was stirred at 90° C. for 18 hours. Thereafter, 1000 parts of toluene was added to the mixture to obtain a condensation product. Subsequently, to 400 parts of mixture, 250 parts of phenol, 20 parts of trioxane and 1 part of p-toluenesulfonic acid were added and the resultant mixture was reacted at 100–160° C. with stirring for 12 hours. Next, the unreacted material were distilled off under a reduced pressure (10 mm. Hg) at 150–170° C. to obtain diphenyl oxide modified phenol resin. The pH of this resin was 5.1. This resin was labeled resin H.

(f) Aniline modified resin

A reactor was charged with 2350 parts of phenol and 5 parts of sulfuric acid and the reactor was heated in an oil bath at 100° C. Next, 1730 parts of formalin (37% aqueous solution) was added dropwise to the reaction mixture in 105 minutes. The mixture was refluxed for 20 minutes. Thereafter, 2000 parts of aniline was added to the mixture and the resultant mixture was heated. After refluxing the mixture for 1 hour, 1200 parts of formalin were added dropwise thereto in 100 minutes. Next, after neutralizing the obtained solution by 50% aqueous solution of NaOH, the mixture was washed well with water under a reduced pressure of less than 10 mm. Hg at 160° C. Water, unreacted phenol and aniline were distilled off. The pH of this resin was 8.1. The obtained resin was labeled resin I.

(g) Nylon modified resin

In 1940 g. of phenol, 100 g. of nylon 6, having a degree of polymerization of 135 prepared by aqueous polymerization of ε-caprolactam, was dissolved and by a process similar to those in Example 1(a), a nylon modified novolac resin was synthesized. The pH of this resin was 6.9. This resin was labeled resin J.

(6–2) Curing of filament from each resin

To each of resins D-J produced in Example 6–1, 10% by weight of TM was added. The mixtures were heated in a bath at 150° C. and dissolved. In each of the obtained compositions, a change of the melt viscosity at 150° C. was not observed over 5 hours period. From each of these compositions, a 3d monofilaments were prepared by melt spinning. The monofilaments were dipped in p-toluenesulfonic acid and thereafter treated on a hot plate at 120° C. to promote the curing speed.

For the purpose of comparison, samples of each of resins D-J which did not contain TM were spun into monofilaments. The curing time when these monofilaments were cured by being contacted with hexamethylene tetramine was measured. The results were shown in Table 10. The cured filament from resin G was 3.1 d. having a tensile strength of 1.6 g./d. and an elongation of 4%.

TABLE 10

Curing of filaments obtained from each resin

| Resin | Catalyst | Curing time |
|---|---|---|
| D | p-Toluenesulfonic acid (TSOA) | Below 5 sec. |
|   | Hexamethylene tetramine (HMT) | 380 sec. |
| E | TSOA | Below 5 sec. |
|   | HMT | 68 sec. |
| F | TSOA | Below 5 sec. |
|   | HMT | 280 sec. |
| G | TSOA | Below 5 sec. |
|   | HMT | Above 300 sec. |
| H | TSOA | Below 5 sec. |
|   | HMT | 120 sec. |
| I | TSOA | Below 5 sec. |
|   | HMT | Above 300 sec. |
| J | TSOA | Below 5 sec. |
|   | HMT | Above 300 sec. |

Example 7

Figure 9:
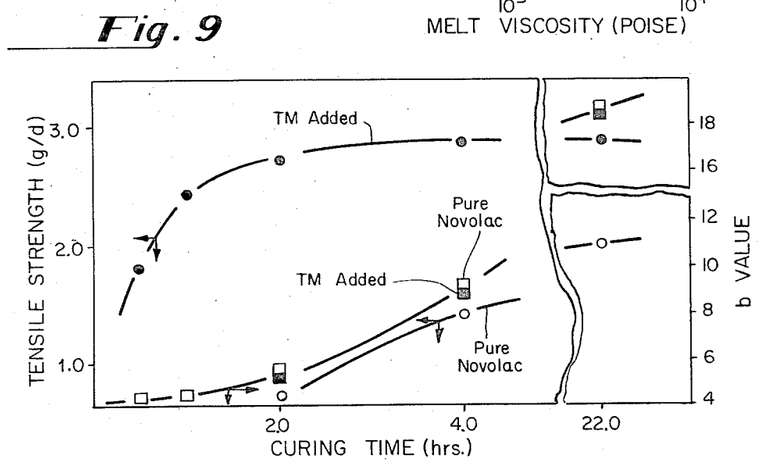
FIG. 9 is a still further graphic illustration of the relationship between tensile strength and curing time of the PF fiber of this invention and the PF fiber of the prior art.
Figure 10:
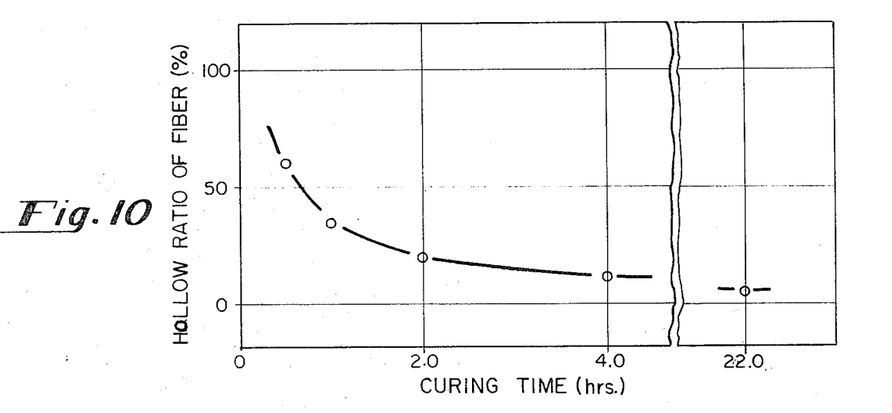
FIG. 10 is a graphic illustration showing the relationship between curing time and the hollow ratio of PF fiber of the prior art.

(7–1) To the resin A, 10% by weight of TM was added. The mixture was spun at 100° C. to obtain an uncured fiber having denier of a single yarn of 1.7 d. (hereinafter referred to as I). For reference, an uncured fiber not having TM (hereinafter referred to as II) was prepared. Fibers I and II were treated in a 1:1 mixed aqueous solution of 35% HCl and 37% formalin and cured. The relation between the cure times and the tensile strengths of the cured fibers is as shown in FIG. 3. The cured fibers of I and II were respectively labeled I' and II'.

Cured fibers I' and II' were heated at 135° C. for 2 hours in acetic anhydride in the presence of 0.1% of p-toluenesulfonic acid. The tensile strengths and degrees of whiteness of the so-obtained modified fibers (hereinafter referred to as I' and II', respectively) are shown in FIG. 9. When the hollow ratios of these modified fibers were sought by the method of Example 2–3 in case of I' said ratios were all 0%, however, in case of II', and the results shown in FIG. 10 were obtained.

As is apparent from FIG. 9 with reference to degree of whiteness, it is desirable to obtain whiteness of a b value below 15 and preferably below 10. However the fact that such a white fiber was obtained with a tensile strength of 2.0 g./d. by the present invention is highly surprising. Accordingly, it is apparent that when a novolac resin is blended with TM curing and acetylation proceeds uniformly and a fiber is obtained which is excellent in degree of whiteness and tensile strength.

(7–2) Effect of an acid catalyst on acetylation

The cured fiber I' (curing time 2 hours) obtained in Example 7–1 was put in acetic anhydride (1 g. of fiber/50 g. acetic anhydride) in the presence of various acid catalysts. Using each of the catalysts shown in Table 11, the cured fiber I' was acetylated at 135° C. for 2 hours. The degrees of whiteness (b values) of the obtained acetylated fiber are shown in Table 11. It is apparent that the effect of the acid catalysts was especially effective in obtaining the preferred degree of whiteness.

TABLE 11

| Number | Catalyst compounds | Amount (g./50 g. Ac$_2$O) | Degree of whiteness (b value) |
|---|---|---|---|
| 1 | Control | 0 | 20 |
| 2 | 35% HCl aqueous solution | 1 | 4 |
| 3 | 80% BF$_3$·etherate | 0.5 | 11 |
| 4 | Acetyl chloride | 1 | 5 |
| 5 | DMF·hydrochloride | 2 | 9 |
| 6 | Oxalic acid | 2 | 12 |

The fiber property of sample No. 2 white modified fiber in the above table was tensile strength 2.1 g./d. and an elongation of 25%. Even after the fiber was left to stand for 2 months its degree of whiteness did not change.

(7–3) *Acetylation by acetyl chloride*

The cured fiber I' obtained in 7–1 (curing time 2 hours) was esterified with acetyl chloride at 140° C. for 2 hours in a sealed tube to obtain an esterified fiber having a *b* value of 16.5. An acid chloride liberates hydrochloride acid as a catalyst under these conditions.

The color stability and flame resistance of the obtained esterified fibers were good and not substantially different from those when esterification was carried out by acetic anhydride.

Example 8

From the mixture obtained by adding 10 g. of tetraoxymethylene to 90 g. of the resin A, a 1.5 d. uncured fiber was prepared. The uncured fiber was cured in a mixed solution of 36% hydrochloric acid and 37% formalic (1:1) at 60° C. for 2 hours and at 90° C. for 30 minutes, to obtain a relatively light cured fiber. The obtained cured fiber had a tensile strength of 1.4 g./d.

The cured fiber was further treated (refluxed for 5 hours) with various kinds of modification agent (30% solutions) in benzene to obtain the results shown in Table 12. The results of treating the obtained fibers at 150° C. under a reduced pressure of 10 mm. Hg for 2 hours are also shown.

TABLE 12

| | | Modified fiber | |
|---|---|---|---|
| | | | *b* value after |
| No. | Modification treating agent | Tensile strength (g./d.) | Curing | Heat treatment (curing) |
| 1 | Succinyl dichloride | 1.5 | 8 | 10 |
| 2 | Fumaric acid dichloride | 1.7 | 7 | 8 |
| 3 | Butanetetracarboxylic acid tetrachloride | 1.6 | 10 | 12 |
| 4 | Benzophenonetracarboxylic acid tetrachloride | 1.4 | 9 | 10 |
| 5 | Oxalic acid dichloride | 1.3 | 9 | 10 |
| 6 | Maleic acid dichloride | 1.9 | 8 | 8 |
| 7 | Isophthalic acid dicloride | 1.7 | 5 | 6 |
| 8 | Trimelletic acid trichloride | 1.7 | 10 | 11 |
| 9 | Dimethyldichlorosilane | 1.4 | 6 | 7 |
| 10 | Cyanuric chloride | 2.0 | 13 | 15 |
| 11 | Phosphorus trichloride | 1.8 | 5 | 5 |
| 12 | Trimethylchlorosilane | 1.5 | 10 | 11 |
| 13 | Benzoyl chloride | 1.4 | 11 | 12 |

Example 9

(9–1) *Curing by succinic acid dichloride*

Resin A was mixed with 10% of TM. The mixture was spun to obtain an uncured yarn whose denier of a single yarn was 1.5 d. This uncured fiber was heated in a 30% benzene-cyclohexane solution (benzene/cyclohexane 1:1) of succinyl dichloride at 80° C. for different curing times to obtain cured fibers. The conversions (reaction ratios) and degrees of whiteness of these cured fibers were measured, and the tensile strengths, percent elongations and *b* values of these fibers after having been heat treated at 150° C. under a reduced pressure of 10 mm. Hg for 2 hours were also measured. The results are shown in Table 13.

TABLE 13

| | | Cured fiber | | Heat treated fiber | | |
|---|---|---|---|---|---|---|
| | Curing time, hrs. | Conversion, percent | *b* value | *b* value | Tensile strength, g./d. | Break elongation, percent |
| Control [1] | (²) | | 45 | 35 | 1.9 | 15 |
| | (³) | 35 | 21 | 19 | 0.8 | 20 |
| Example | 30 | 49 | 20 | 21 | 1.5 | 8 |
| | 1 | 54 | 15 | 19 | 1.8 | 15 |
| | 2 | 69 | 8 | 13 | 2.1 | 36 |
| | 4 | 82 | 5 | 10 | 2.1 | 35 |
| | 5 | 88 | 5 | 9 | 2.4 | 38 |

[1] Control was obtained by curing the uncured fiber by an acid catalyst.
[2] 2 minutes.
[3] 10 minutes.

(9–2) *Curing and whitening by various acid chlorides*

The tensile strengths and degrees of whiteness of the cured fibers obtained by a method similar to that in Example 9–1 using various kinds of acid chlorides as well as the degrees of whiteness of the cured fibers after they had been heat treated are shown in Table 14. The curing conditions of the cured fibers in Table 14 were as follows:

Solvent: 1:1 mixture of benzene-cyclohexane;
Concentration of the cross-linking agent: 30% by weight;
Curing temperature and time: Bath temperature 60° C. for 1 hour and thereafter 90° C. for 5 hours;
Resin used and denier of a single yarn of the uncured fiber: Resin A 1.5 d.
Heat treating condition: 150° C., 10 mm. Hg, 2 hours.

TABLE 14

| No. | Cross-linking agent | Tensile strength of the cured yarn (g./d.) | Degree of whiteness (*b* value) | |
|---|---|---|---|---|
| | | | Cured fiber | Heat treated fiber |
| 1 | Oxalyl dichloride | 1.5 | 7 | 10 |
| 2 | Fumaric acid dichloride | 1.4 | 6 | 8 |
| 3 | Maleic acid dichloride | 1.9 | 11 | 12 |
| 4 | Butenetricarboxylic acid trichloride | 2.1 | 9 | 11 |
| 5 | do | 1.9 | 11 | 15 |
| 6 | Butenetetracarboxylic acid tetrachloride | 2.3 | 5 | 8 |
| 7 | 1,4-cyclohexanedicarboxylic dichloride | 1.6 | 6 | 7 |
| 8 | Isophthalic acid dichloride | 1.3 | 12 | 15 |
| 9 | Phthalic acid dichloride | 1.1 | 13 | 17 |
| 10 | Pyridine 3,5-dicarboxylic acid dichloride | 1.7 | 15 | 20 |
| 11 | Benzophenonetetracarboxylic acid tetrachloride | 1.9 | 15 | 21 |
| 12 | Naphthalene-1,5-dicarboxylic acid dichloride | 1.6 | 19 | 20 |
| 13 | Naphthalene-1,4,5-8-tetracarboxylic acid tetrachloride | 2.0 | 20 | 23 |

(9–3) *Curing and modification by other halides*

From a composition obtained by adding 10% by weight of TM to the resin A, a 1.5 d. uncured fiber was obtained. The fiber was cross-linked under conditions the same as those in Example 9–2 and the results shown in Table 15 were obtained (cross-linking time 4 hours).

TABLE 15

| Modification treating agent | Tenacity, g./d. | Elongation, percent | Coloration |
|---|---|---|---|
| 1. Dimethyldichlorosilane | 2.1 | 22 | Light brown. |
| 2. Cyanuric chloride | 2.6 | 15 | Do. |
| 3. 1.3-benzenedisulfonyl chloride | 2.7 | 18 | Brown. |

(9–4) *Effect of acid catalyst*

The process of 9–3 was carried out in a solvent into which hydrochloric acid gas had been introduced to obtain the results of Table 16 (cross-linking time 2 hours). The results about the same as those obtained in Example 9–3. However, the curing rates were somewhat faster.

TABLE 16

| Modification treating agent | Tensile strength, g./d. | Break elongation, percent | Coloring |
|---|---|---|---|
| 1. Dimethyldichlorosilane | 2.0 | 32 | Almost colorless. |
| 2. Cyanuric chloride | 2.3 | 16 | Light brown. |
| 3. 1.3-benzenedisulfonyl chloride. | 2.1 | 12 | Brown. |

Example 10

Using the resins synthesized in Example 6, p-cresol copolymerization novolac F, bisphenol A-novolac G, diphenyl oxide modified novolac H, and aniline modified novolac I by a method similar to that in Example 9–1, monofilaments were prepared. The monofilaments were cured (curing time 4 hours). The results are shown in Table 17.

TABLE 17

| Number | Resin | Modification treating agent | Tensile strength of the modified yarn fibers (g./d.) | Degree of whiteness (b value) Cured fibers | Heat treated fibers |
|---|---|---|---|---|---|
| 1 | F | Succinyl dichloride | 1.5 | 8 | 9 |
| 2 | | Fumaric acid dichloride | 1.2 | 8 | 10 |
| 3 | | Butenetetracarboxylic acid tetrachloride. | 2.4 | 4 | 5 |
| 4 | G | Benzophenonetetracarboxylic acid tetrachloride. | 2.5 | 4 | 5 |
| 5 | H | Naphthalene-1.5-dicarboxylic acid dichloride. | 1.5 | 11 | 15 |
| 6 | | Oxalyl dichloride | 1.9 | 12 | 14 |
| 7 | I | Butenetricarboxylic acid trichloride | 1.9 | 10 | 14 |
| 8 | | Maleic acid dichloride | 2.0 | 11 | 12 |

Example 11

(11–1) One g. of an uncured fiber (I) obtained from a blend of the resin A and 10% by weight of TM was taken and immersed in a mixed solution of 10 parts of phosphorus trichloride and 25 parts of cyclohexane, heated at 40° C. for 1 hour and at 60° C. for 2 hours and reflux was continued for 8 hours. The cross-linked fiber was removed, washed with cyclohexane and thereafter immersed in 25 parts of propylene oxide. Reflux was carried out for 2 hours to stabilize the fiber. The obtained cross-linked fiber was slightly cream colored. However, when the fiber was left to stand in air for a long period of time or heated, the color did not change. Even when the fiber was placed in the flame of a match, it became black with very slight smoke and it did not burn or support a flame. The obtained modified fiber had a tensile strength of tenacity of 1.9 g./d. and a break elongation of 26%. As to the hydrolytic property, even when said fiber was heated at 100° C. in hydrochloric acid for a long time, the shape of the fiber did not change.

(11–2) *Stabilization by propylene oxide*

Uncured fibers II and III prepared from compositions obtained by blending the bisphenol A novolac G obtained in Example 6 and the resin A with 10% by weight of TM, respectively, were cross-linked by phosphorus trichloride and stabilized by propylene oxide to obtain two cross-linked fibers both of which were excellent in color, stability and flame resistance. The tensile strength and break elongations of the cured fibers are shown in Table 18.

TABLE 18

| Uncured fiber | Cured fiber Tensile strength | Break elongation (percent) |
|---|---|---|
| II | 1.7 | 15 |
| III | 2.4 | 31 |

(11–3) Using the various kinds of modification treating agent shown in Table 19, uncured fibers A were cured. To cure the fibers the fibers were treated with a solution consisting of 10 parts of the curing agent per 15 parts of cyclohexane and 15 parts benzene. The fibers werec ured in this solution at 90° C. for 1 hour, 60° C. for 2 hours and 90° C. for 15 hours. The fibers were then stabilized by treating them with propylene oxide at the reflux for 5 hours. The results are shown in Table 19.

TABLE 19

| Modification treating agent | Modified yarn Tensile strength (g./d.) | Break elongation (%) |
|---|---|---|
| POCl₃ | 0.8 | 5 |
| PCl₃ | 0.7 | 9 |
|  | 1.2 | 15 |
|  | 1.1 | 12 |
|  | 1.0 | 18 |
| (PNCl₂)₃ | 1.1 | 12 |

What is claimed is:

1. The process for the manufacture of a cured cross-linked fiber from a phenol-formaldehyde resin comprising melt spinning a resin composition comprised of a curable novolac resin having a pH of at least 4 and a melt viscosity of 300–5,000 poise and a member selected from the group consisting of tetraoxymethylene, trioxane and mixture thereof and curing the obtained uncured resin fiber in the presence of an acid catalyst to provide said cured fiber.

2. The process according to Claim 1, wherein said resin is comprised of a phenol-formaldehyde novolac and tetraoxymethylene.

3. The process according to Claim 1 wherein the amount of said tetraoxymethylene, trioxane or mixture thereof is within the range of 1–20% by weight of said resin.

4. The process described in Claim 1 wherein said resin composition has a melt viscosity of about 300–3000 poises when melt spinning.

5. The process according to Claim 1 wherein said uncured resin fiber is cured in the presence of said acid catalyst and formaldehyde or a compound which produces formaldehyde during curing.

6. The process according to Claim 1 wherein said uncured resin fiber is cured at a temperature within the range of about 0–180° C. and thereafter the cured resin fiber is heat treated at a temperature higher than said temperature which is within the range of about 70–250° C.

7. The process according to Claim 1 wherein said fibers in the uncured or cured state are reacted with at least one modified compound selected from the group consisting of acid halide, acid anhydride, phosphorus halide and silicone halide in the presence of an acid catalyst.

8. The process according to Claim 7 wherein said modifier compound is selected from the group consisting of
(a) lower aliphatic acid derivatives
(b) a compound of the formula

$$R_1(COX)_n$$

wherein X stands for halogen and $R_1$ stands for a polyvalent radical selected from aliphatic and aromatic radicals, and $n$ is an integer of from 2 to 4.

(c) a compound of the formula $$R_2(X)_2$$

wherein X stands for halogen and $R_2$ is a member selected from the class consisting of wherein $R_3$ stands for halogen, lower alkyl and alkoxyl, phenyl and phenoxy.

9. The process according to Claim 8 wherein modified compound is acetic anhydride.

10. The process according to Claim 8 wherein said modifier compound is a phosphorus chloride compound.

References Cited
UNITED STATES PATENTS

| | | | |
|---|---|---|---|
| 3,716,521 | 2/1973 | Economy et al. | 260—59 |
| 3,650,102 | 3/1972 | Economy | 260—59 |
| 3,651,199 | 3/1972 | Blume | 264—263 |
| 3,481,901 | 12/1969 | Prochaska | 260—59 |
| 3,558,560 | 1/1971 | Huck et al. | 260—59 |

JOHN C. BLEUTGE, Primary Examiner

U.S. Cl. X.R.

260—59, 838; 264—236, 347